(12) United States Patent
Grim

(10) Patent No.: US 6,221,257 B1
(45) Date of Patent: Apr. 24, 2001

(54) APPARATUS AND METHOD FOR TREATMENT OF DISCHARGED WATER AND OTHER FLUIDS

(76) Inventor: Terry L. Grim, Rte. 1, Box 1208, Harpers Ferry, WV (US) 25425

( * ) Notice: Subject to any disclaimer, the term of this patent is extended or adjusted under 35 U.S.C. 154(b) by 0 days.

(21) Appl. No.: 09/360,156

(22) Filed: Jul. 26, 1999

Related U.S. Application Data

(60) Provisional application No. 60/101,156, filed on Sep. 21, 1998.

(51) Int. Cl.[7] .................................................. C02F 1/70
(52) U.S. Cl. ...................... 210/747; 210/757; 210/806; 210/155; 210/170; 210/206; 422/239
(58) Field of Search ................................. 210/747, 749, 210/757, 806, 155, 170, 198.1, 205, 206; 422/239

(56) References Cited

U.S. PATENT DOCUMENTS

| | | | |
|---|---|---|---|
| 3,595,786 | * 7/1971 | Horvath et al. | 210/198.1 |
| 3,887,468 | * 6/1975 | Bray | 210/206 |
| 4,226,939 | 10/1980 | Wegner | 435/247 |
| 4,364,835 | 12/1982 | Cheh | 210/752 |
| 4,584,106 | * 4/1986 | Held | 210/206 |
| 4,759,907 | * 7/1988 | Kawolics et al. | 422/7 |
| 4,780,197 | * 10/1988 | Schuman | 210/206 |
| 4,816,177 | 3/1989 | Nelson et al. | 252/181 |
| 5,053,206 | * 10/1991 | Maglio et al. | 210/220 |
| 5,096,721 | 3/1992 | Levy | 426/66 |
| 5,192,571 | 3/1993 | Levy | 426/433 |
| 5,405,540 | 4/1995 | Tang | 210/752 |
| 6,077,484 | * 6/2000 | Graves | 422/277 |

* cited by examiner

Primary Examiner—David A. Simmons
Assistant Examiner—Betsey Morrison Hoey
(74) Attorney, Agent, or Firm—Roylance, Abrams, Berdo & Goodman, L.L.P.

(57) ABSTRACT

A fluid treating apparatus includes a primary conduit defining a flow path for the fluid being treated. A column is connected to the pipe forming an inlet into the flow path. A reaction container having a perforated side wall enclosing a treating agent is positioned in the inlet and in the flow path. In preferred embodiments, the method and apparatus is for dechlorinating water prior to discharge. One or more aerators can also be mounted in the pipe to aerate water passing through the conduit upstream and/or downstream of the reaction container.

33 Claims, 8 Drawing Sheets

APPARATUS AND METHOD FOR TREATMENT OF DISCHARGED WATER AND OTHER FLUIDS

CROSS REFERENCE TO RELATED APPLICATION

This application claims the benefit under 35 U.S.C. § 119(e) of prior provisional application Ser. No. 60/101,156, filed Sep. 21, 1998.

FIELD OF THE INVENTION

This invention relates generally to an apparatus and method for treatment of water to be discharged into the environment. More particularly, this invention relates to an apparatus and method for dechlorinating water for discharge into the environment.

BACKGROUND OF THE INVENTION

There are occasions when water that has been treated for potability must be discharged into the environment. State and federal environmental regulations restrict certain chemicals and the concentration of certain chemicals that can be discharged into the environment. For example, water from filtration plants which has been treated for potability may contain more chlorine than is permitted by regulations for direct discharge into rivers, bays, lakes, and other water collection areas. Potable water, which is typically treated at water treatment facilities for use as drinking water, is generally treated with chlorine. Water from these treatment facilities are transported to residences and businesses by way of water mains and other water transportation means, such as pipes, trucks, and rail tankers.

Occasionally, the water mains transporting potable water must be drained so that an inspector can enter the water main or water tunnel for inspection purposes, among other reasons. In the past, the water was simply pumped out of the pipes or tunnels into the streets, roadways or nearby streams, without further treatment. To comply with the above-mentioned regulations, a need exists for an on-site system, and preferably a portable system, for treating the water as it is being discharged, such as an apparatus that can be connected to a fire hydrant or hose.

Similarly, when new pipes or tunnels are placed in a region, they are first cleaned with various chemicals, such as chlorine, to remove contaminants therefrom. When chlorine is used, the pipes are filled with chlorinated water for a predetermined period of time to cleanse the pipes and kill any contaminants therein. At the end of this period, the chlorinated water is typically drained into the street, roads, or nearby rivers and streams. The heavily chlorinated water used to decontaminate new pipes can be hazardous to the environment if discharged without prior treatment, such as dechlorination.

Chlorinated potable water is discharged into the environment for many other reasons. In addition to water mains and fire hydrants of water treatment facilities, the source of the potable chlorinated water can be from the spigots of residences and businesses, as well as street washing vehicles and water transportation vehicles. For example, swimming pools, ski resorts employing systems to artificially produce snow, and businesses and residences that engage in landscaping, discharge significant amounts of water to the environment. If the water is treated potable water, then dechlorination may be required to comply with regulations on discharged water to protect the environment. Damage to the environment, especially fish and other wildlife, can result from excess discharge of chlorine and other chemicals into the environment from potable water or other discharged fluids.

Accordingly, there is a need for a method and apparatus for the removal of chlorine and other contaminants from water or other fluids prior to being discharged into the environment.

SUMMARY OF THE INVENTION

Water is often times treated with chlorine or chlorine compounds at water treatment facilities and fresh water plants to destroy contaminants that otherwise render the water unsafe for human consumption. However, it is not desirable to discharge chlorinated, potable water into the environment, especially into fragile and sensitive ecosystems since high chlorine levels can kill some fish and aquatic plants. In accordance with an aspect of the present invention, an apparatus is provided to remove dissolved chlorine from potable or otherwise treated water prior to discharge into the surrounding environment. The apparatus is configured for use with other fluids to remove chemicals from or add chemicals or air to water or other liquid.

In preferred embodiments, chlorinated water (e.g., potable water from a water main or fire hydrant) is introduced into an apparatus constructed in accordance with the present invention. The apparatus contains a reaction container with an internal chamber containing a dechlorination compound, such as sodium sulfite. The chlorinated water is introduced into the apparatus and flows through a pipe containing an aeration device. The aeration device can be a disk having variably spaced holes, a wire screen or screens, a ceramic frit, or other suitable aeration component. After passing through the aeration device, the water proceeds past a reaction zone for contacting and reacting with the dechlorination agent. The chlorine and chlorine compounds in the water react with the dechlorination agent to remove the chlorine from the water. After passing the reaction zone, the water is discharged from the apparatus. The reaction container is preferably filled with sodium sulfite or other dechlorinating agent to remove chlorine from potable water as known in the art. The chamber can be provided with other chemicals to treat other fluids by removing or adding chemicals.

In further embodiments, the treated (e.g., dechlorinated) water can pass through another component of the pipe where air is introduced to increase the amount of dissolved oxygen prior to discharge from the apparatus. In this manner, not only is chlorine removed from the water prior to discharge, but also the oxygen level of the discharged water is increased.

The aspects and objects of the invention are basically attained by providing an apparatus for treating water that comprises a conduit having a longitudinal axis with an upstream end defining a water inlet and downstream end defining a water outlet. The conduit defines a substantially linear flow path extending substantially coaxially to the longitudinal axis. A supply inlet extends into the conduit and substantially perpendicular to the conduit. A reaction container is positioned in the supply inlet and the conduit. The reaction container is dimensioned for containing a water treating agent and having a side wall with a plurality of apertures therein for allowing water passing through the conduit to pass through the reaction container.

The aspects of the invention are further attained by providing an apparatus for treating water that comprises a water conduit having a side wall, a water inlet at an upstream end of the conduit, and a water outlet at a downstream end of the conduit. The side wall defines an axial passage extending from the inlet to the outlet. A supply conduit is coupled to the side wall and defines an opening through the side wall into the water conduit. A reaction container for containing a water-treating agent is positioned in the supply conduit and in the axial passage of the water conduit. The reaction container has a side wall with a plurality of apertures for allowing water in the axial passage to flow through the reaction container. The reaction container is dimensioned to receive a water-treating agent in an amount to effectively treat water passing through the water conduit.

The aspects of the invention are still further attained by providing a method of treating water which comprises the steps of feeding water through a treating apparatus. The apparatus has a conduit with an inlet for receiving untreated water and an outlet for discharging treated water. An inlet pipe is coupled to the conduit and defines a transverse inlet into the conduit. The conduit defines a substantially axial flow path through the apparatus. A water-treating agent is supplied into a reaction container and positions the reaction container in the conduit through the transverse inlet. The reaction container has a side wall with a plurality of apertures therein. Water is fed through the conduit to pass through the reaction container to contact the water-treating agent and to treat the water and discharge treated water through the outlet.

Other objects, advantages and salient features of the invention will become apparent from the following detailed description which, taken in conjunction with the annexed drawings, disclose preferred embodiments of the invention.

BRIEF DESCRIPTION OF THE DRAWINGS

The various aspects, advantages and novel features of the present invention will be more readily comprehended from the drawings, in which.

DETAILED DESCRIPTION OF THE PREFERRED EMBODIMENT

The present invention is directed to a method and apparatus for treating a liquid, and particularly water, with a treating agent. The apparatus basically includes a primary conduit defining a substantially linear flow path for the liquid being treated, and a reaction container positioned in the flow path. The invention is primarily directed to a method and apparatus for treating water, and particularly for dechlorinating water by treating chlorinated water with a dechlorinating agent and aerating the water. It has been found that aeration of the water upstream and downstream of the water treating zone provides improved results compared to prior devices. It will be understood that the method and apparatus of the invention can be used to treat various fluids and is not limited to treating water. Similarly, the treating agent can be any suitable agent capable of treating the fluid.

Figure 1:
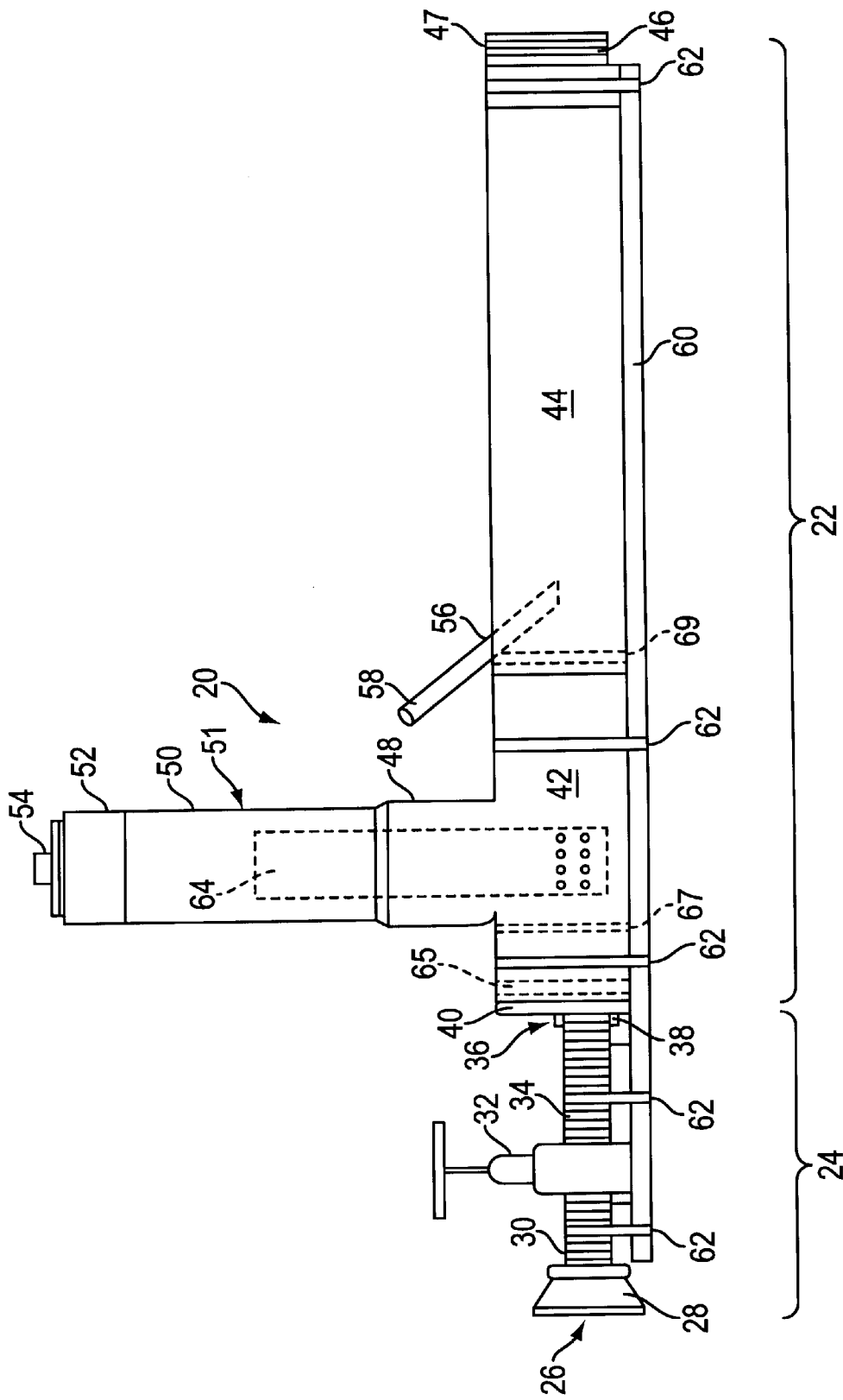
FIG. 1 is a side elevational view of a discharge fluid treatment apparatus constructed in accordance with an embodiment of the present invention.

Referring to the drawings, FIG. 1 depicts a fluid treatment apparatus 20 in accordance with a first embodiment of the present invention. The fluid treatment apparatus 20 comprises a pipe assembly 22 having a longitudinal dimension and defining a substantially straight flow path. In the embodiment illustrated, the pipe 22 is connected to a coupling assembly 24. The coupling assembly 24 has an inlet 26, which can be a fire hose coupling 28 as shown in the illustrated embodiment. The dimensions of the fire hose coupling are, for example, about 2.5 inches for the outer diameter and 2 inches for the inner diameter. The coupling assembly 24 comprises a brass nipple 30 connected between the fire hose coupling 28 and a two inch gate valve 32. The brass nipple 30 can be three inches long and two inches in diameter. A second brass nipple 34 is connected to the outlet of the gate valve 32 and can have the same dimensions as the brass nipple 30. As shown in FIG. 1, one end of the brass nipple 34 is connected to an inlet 36 of the pipe assembly 22. Accordingly, fluid, such as water, can be transported by the coupling assembly 24 from a fire hydrant into the pipe 22 where the water is treated as described in further detail below. The gate valve 32 is adjusted to control the flow rate through the apparatus to control the retention time of the water in the apparatus and the extent of treatment by the water treating agent.

To couple the brass nipple 34 to the pipe assembly 22, a 2×2 inch polyvinyl chloride (PVC) diameter male thread 38 can be used. The inlet 36 of the pipe 22 can be a 4×2-inch PVC section 40. The pipe 22 comprises a 4×4-inch PVC T-shaped branch section 42 that is connected to another pipe section 44 of four inch diameter PVC pipe. The section 42 has a linear section defining a linear flow path for water passing through the apparatus. The outlet 46 of the pipe section 22 can be a four-inch PVC having a four-inch male thread 47. The T-shaped branch section 42 also has a section 48 that is preferably connected to column section 50 of four-inch diameter PVC pipe. The section 48 preferably extends substantially perpendicular to the linear flow path of water in the section 42. A four-inch diameter PVC coupling 52 having internal threads is connected to section 50. A removable cover 54 is preferably provided at the open end of the coupling 52. The perpendicular section 48 and the column 50 form a housing 51 for the dechlorination agent as discussed hereinafter.

The pipe assembly 22 is preferably provided with an opening 56 in which an air inlet pipe 58 is inserted. The air inlet pipe 58 can be a one-half inch diameter by eight inch PVC pipe, the purpose of which is described below. The apparatus 20 is preferably mounted on a support 60 by a number of straps 62. The support 60 can be made of wood and the straps 62 are preferably stainless steel bands.

Figure 2:
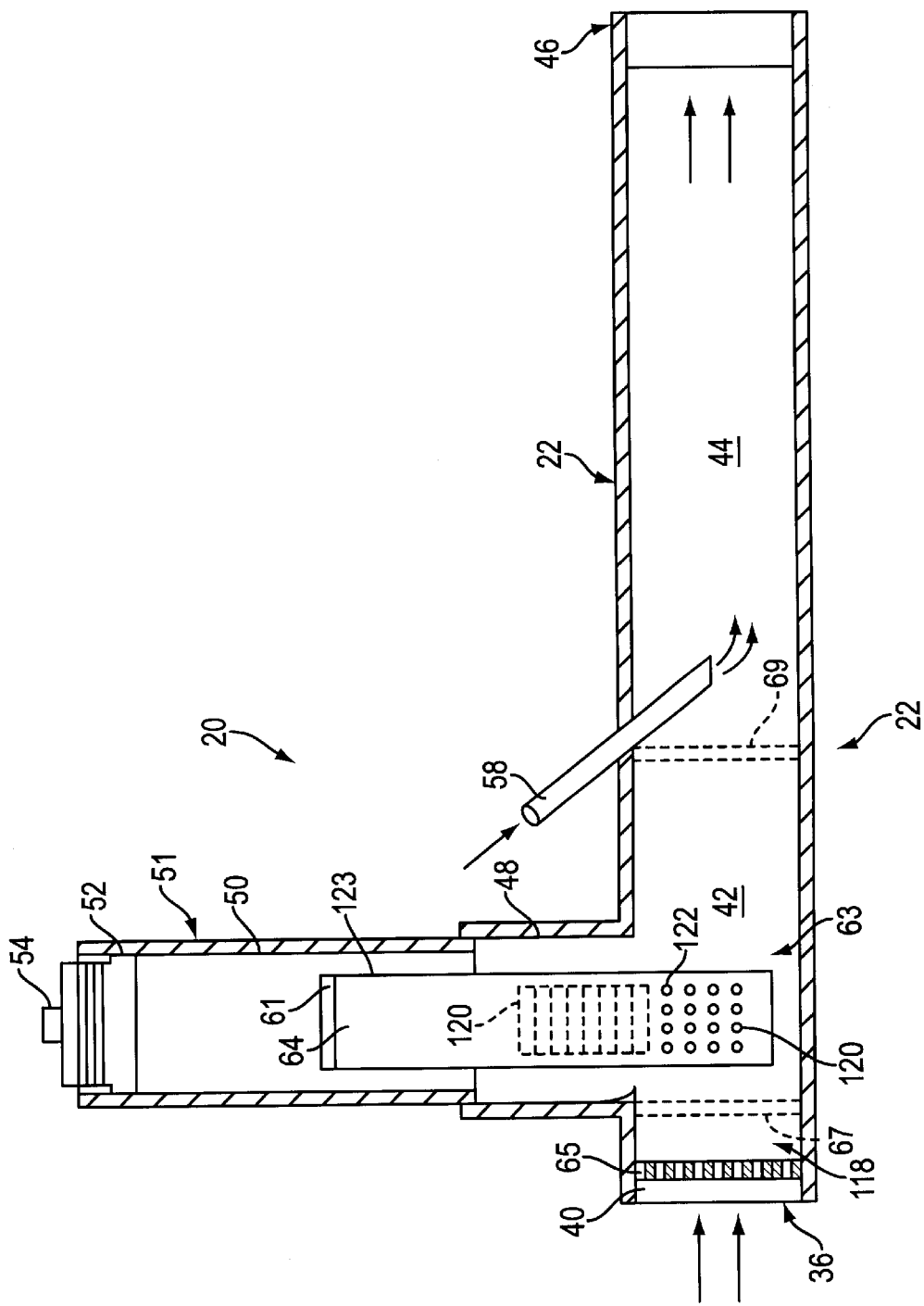
FIG. 2 is a partial cross-sectional side view of the apparatus of FIG. 1.
Figure 5:
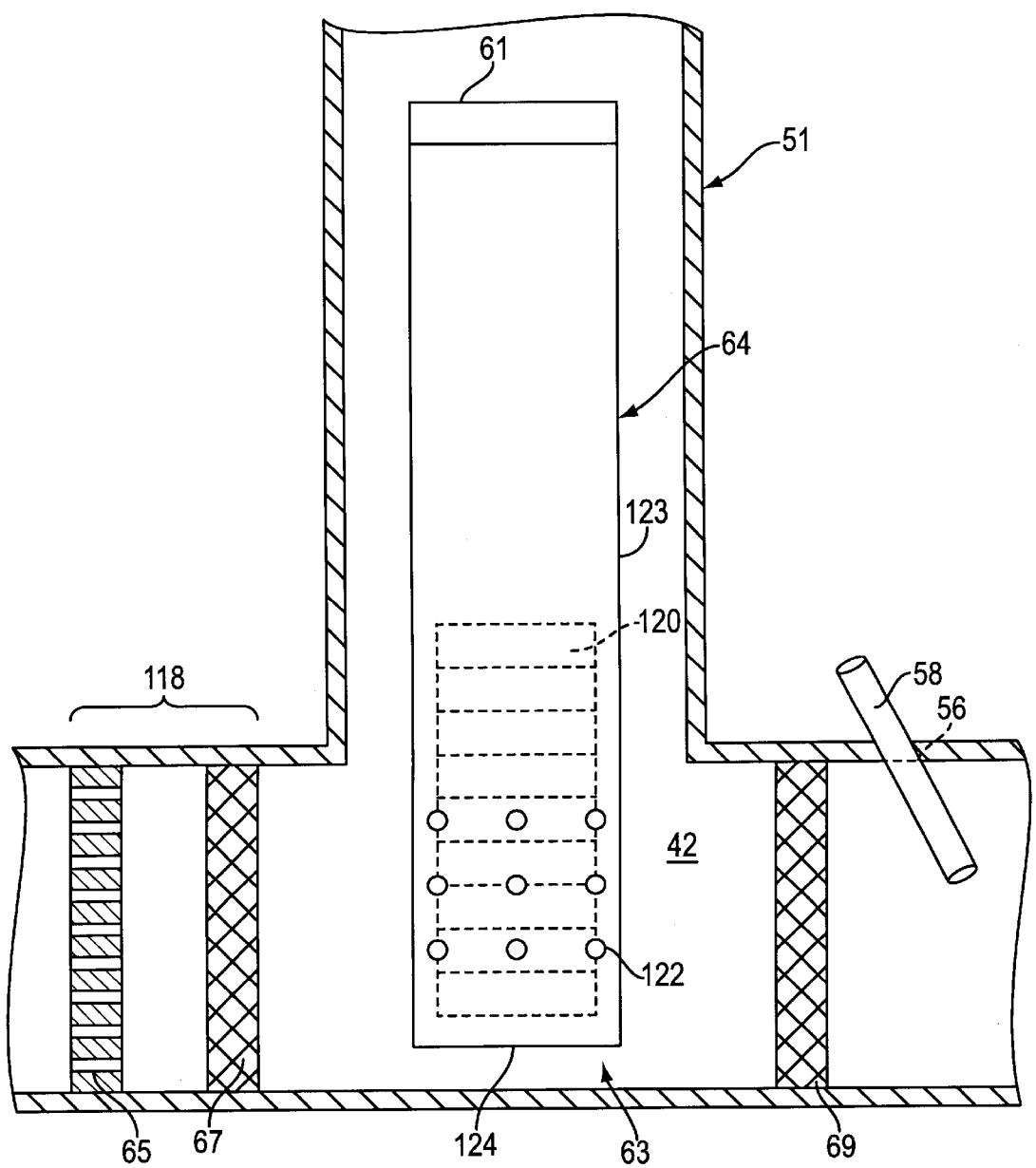
FIG. 5 is a side view in cross-section showing the aeration components and a chemical reaction chamber of the apparatus of FIG. 1.
Figure 7:
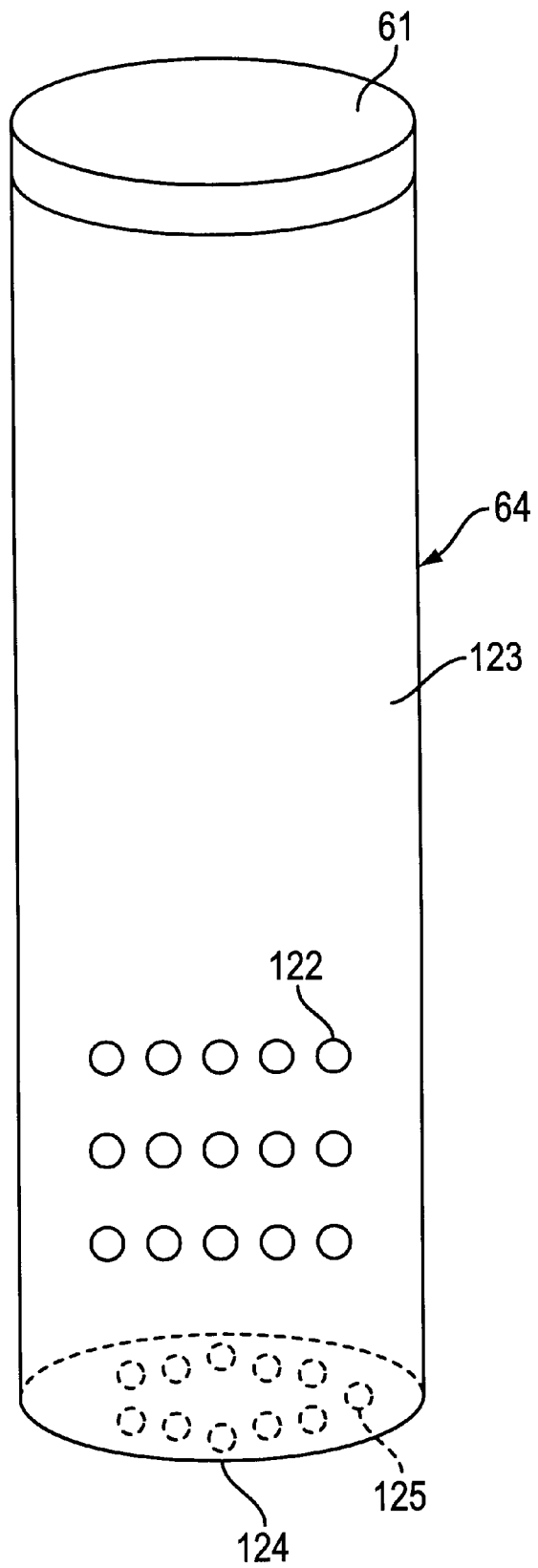
FIG. 7 is a front view of a chemical reaction chamber constructed in accordance with an embodiment of the present invention.

In accordance with an aspect of the present invention, a chemical reaction container 64, which preferably has both ends closed, is configured to be inserted into a reaction zone 63 of the pipe section 42 as shown in FIGS. 2, 5 and 7. The reaction container 64 is inserted through the open end of the coupling 52 and position in the housing 51 and rests against the bottom surface of pipe section 42. The reaction container 64 has a removable cover 61 for inserting tablets 120 or other fluid treating agents into an internal chamber. Typically, the treating agent is a solid tablet or granule of a water soluble compound. The side wall 123 of the reaction container 64 comprises a number of holes 122 along the circumference thereof to allow water from the inlet 36 of the pipe assembly 22 to flow through at least a portion of the container 64 when the container is in the reaction zone 63 of the pipe 42 and therefore towards the outlet 46 of the pipe 22. Chemicals, which have been inserted into the container 64, can therefore react with the water flowing through the pipe 22. The reaction container can be made of a wire mesh or screen having a pore size to retain the treating agent in the chamber and allow the water to pass freely through.

Figure 8:
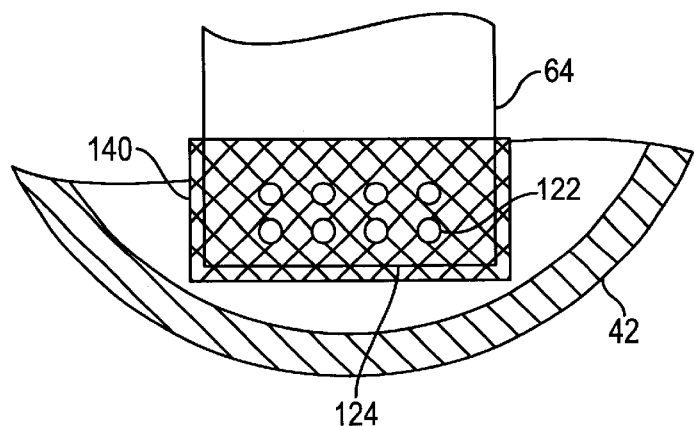
FIG. 8 is a partial side view of a chemical reaction chamber shown in a partial cross-section of an apparatus constructed in accordance with an embodiment of the present invention.

With reference to FIG. 7, apertures 122 are provided in the side wall 123 of the reaction container 64. The size of the apertures 122 can range from $1/64$ of an inch to one-half an inch diameter for a three-inch diameter container. The container 64 is preferably no less than three inches in diameter for use in a four-inch diameter pipe 42. The size of the apertures 122 is preferably $7/64$ of an inch and distributed evenly around the side wall. The container 64 can also be a coil in lieu of a solid structure with holes therein. Aerated chlorinated water flows through apertures 122 in the side wall 123 of the container 64 and reacts with the sodium sulfite tablets 120. The bottom wall 124 of the container 64 is generally flat and perpendicular to the side wall 123, as shown in FIG. 8. The top end of the reaction container 64 is preferably closed by a removable closure 61.

In FIGS. 2 and 5, the reaction container 64 is shown spaced from the bottom surface of the pipe section 42. Generally, the reaction container 64 is free floating in the column 51 and rests against the bottom surface of the pipe section 42. The bottom wall 124 of the reaction container 64 is generally flat so that the outer edges of the bottom wall 124 rest on the bottom surface of the pipe section and form a semicircular open area between the bottom wall 124 and the pipe section 42 allowing some water beneath the container 64 without passing through the side wall. Alternatively, a screen 140 can be wound around the bottom portion of the side wall 123 of the container 64. The apertures of the screen are preferably smaller than the apertures in the side wall, such that as the sodium sulfite tablets 120 dissolve in the water and become smaller, they are not carried into the water flowing in the pipe 22 prematurely. It should be noted that premature introduction of excess sodium sulfite into the water can result in overdosing.

Figure 9:
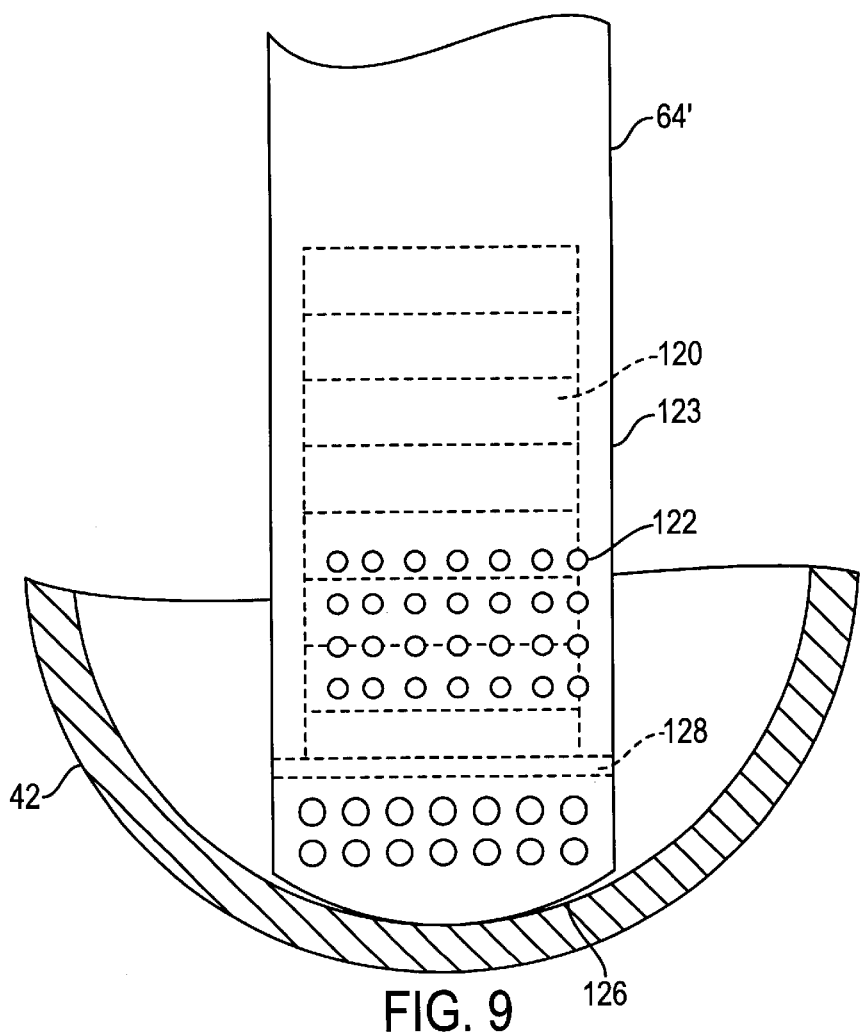
FIG. 9 is a partial side view of the chemical reaction chamber in a further embodiment.

In a further embodiment, as shown in FIG. 9, a curved bottom wall 126 can be used with a chamber 64', which conforms to the bottom surface of the pipe 42 carrying the aerated chlorinated water. The bottom wall 124 of the chamber can be a plastic barrier sheet having a thickness of at least three millimeters.

In the embodiment of FIG. 9, the reaction container 64' containing the sodium sulfite tablets 120 has a shelf 128 towards the bottom of the container 64 to support the tablets 120. As shown, the shelf 128 is spaced from the bottom wall 126 and extends perpendicular to the longitudinal axis of the reaction container 64'. In this manner, apertures 122 can be provided in the side wall 123 above and below the shelf 128 such that water passes both below and above the shelf 128 of the chamber, allowing the container 64' to be suspended in the water flow pipe section 42 in a manner controlled by the water flowing therethrough.

The apparatus 20 can be connected to a fire hydrant via a hose (not shown). Water from the fire hydrant flows through the apparatus 20 and is discharged through the outlet 46 of the pipe assembly 22. It is to be understood that the fluid treatment apparatus 20 is not limited to use with fire hydrants. The coupling assembly 24 can have many different configurations for use in different applications such as connections to hoses adapted for use with residential and commercial spigots, among other water outlet devices. Accordingly, the apparatus 20 can be dimensioned to be commensurate in size with respect to the outlet device and water flow rate being used to discharge water.

Referring to FIGS. 2 and 5, the pipe assembly 22 is provided with an aerator plate 65 and wire mesh screens 67 and 69 extending across the cross-section of the pipe 42. The plate 65 and wire mesh screen 67 form a first mixing zone 118 upstream of the reaction container. The plate 65 is provided with a plurality of apertures 71 to control the flow of water through the pipe. The plate 65 and wire mesh screen 67 provide aeration and mixing of water entering the inlet section pipe 40 of pipe assembly 22. The wire mesh screen 69 is provided downstream of the reaction zone to provide additional aeration of the water and mixing of the water and water treating agent that has been treated by reacting with a substance in the container 64 and is subsequently flowing from the branch section 42 to the pipe section 44 to be discharged from the outlet 46 of the pipe assembly 22.

Figure 6:
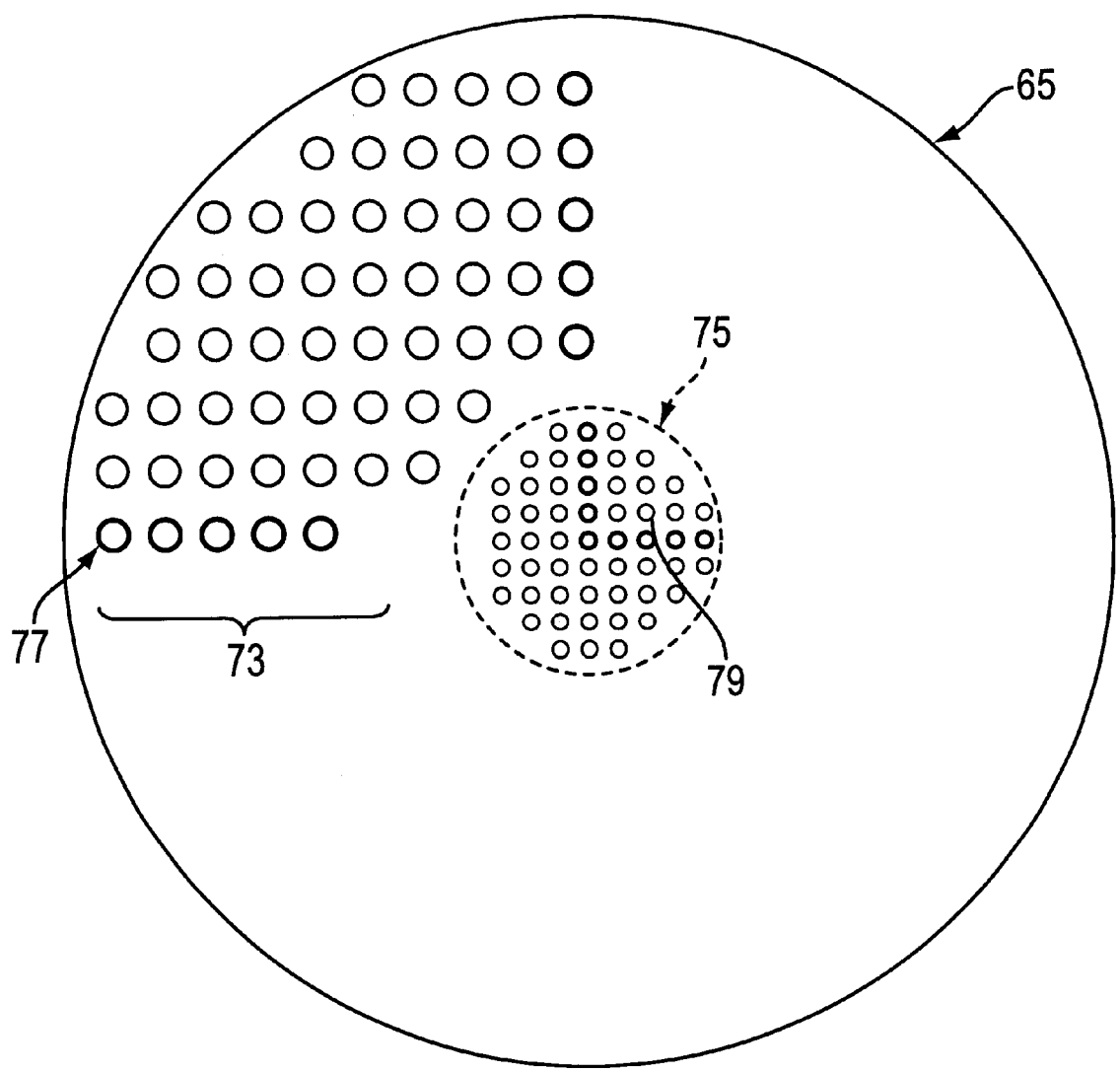
FIG. 6 is a front view of an aeration device constructed in accordance with an embodiment of the invention.

As shown in FIG. 6, the plate 65 includes a first group of outer apertures 77 provided in a peripheral or circumferential region 73. For purposes of illustration, the apertures 77 are shown covering a portion of the plate 65, although it will be understood that the apertures 77 cover the entire peripheral area of the plate. Generally, the apertures 77 are uniformly spaced across the surface of the plate 65. A second group of inner apertures 79 are provided in a central region 75 indicated by the dotted line. The outer apertures 77 are preferably larger than the inner apertures 79. The outer apertures 77 and the inner apertures 79 are preferably uniformly distributed across their respective regions 73 and 75. For example, a four-inch diameter plate, which fits into a four-inch diameter pipe, outer apertures 77 are preferably located in the outer 1.5 inches of the aerator plate 65, as measured from the perimeter thereof. The dimension of the outer apertures 77 for a four-inch diameter plate in the outer region 73 is preferably $9/64$ of an inch in diameter. The central region 75 of a four-inch diameter plate 65 preferably has a radius of a one-half an inch from the center of the plate 66. The dimension of the inner apertures 79 for the center region 75 is smaller than those in the outer region 73, and is preferably $7/64$ of an inch in diameter.

In embodiments of the invention, the use of the smaller apertures 79 in the center of the plate 65 provide a restricted flow path in the center of the cross-section of the plate and, thus, a restricted flow through the center of the pipe section 42 to reduce the force of water on the reaction container 64 and the water treating agent therein. Reducing the force of the water in the central area of the pipe section 42 reduces the flow of water through the reaction container 64 and prevents overdosing and tablet breakdown at an excessive rate. The number of apertures 79 in the aeration plate 65 contained in a typical four-inch diameter plate 65 is approximately 20 to 100 holes, spaced to maintain the integrity of the plate 65, while maximizing aeration. The dimension of the apertures can be varied depending on the diameter of the plate and the desired flow path of the water in the pipe. The screen 67 is preferably a wire mesh that is placed on the downstream side of the plate 65, and is positioned proximally to the plate 65. The screen 67 is used for additional mixing or aeration of the chlorinated water or fluid being treated for discharge.

The method of treating water using the apparatus 20 is described with reference to FIGS. 1, 2 and 5–8. Potable chlorinated water, for example, is introduced into an inlet port 26 as shown in FIG. 1. Following a coupling 24, as shown in FIG. 5, the water passes through a zone 118 within the inlet of the pipe assembly 22. The mixing zone 118 is defined by the plate 65 and the wire-mesh screen 67. The plate 65 and screen 67 are both preferably securely mounted proximally to the inlet of the branch section 42 in a conventional manner and preferably extend along the entire cross-section of the section 42 and perpendicular to the flow of water through the apparatus. The plate 65 is preferably positioned upstream of the screen 67. The screen 67 in alternative embodiments can be disposed upstream of the plate 65 (i.e., more proximally with respect to the inlet of the branch sections 42). In the aeration zone 118, the chlorinated water passes through the plate 65 and screen 67. In further embodiments, aerators can be included, such as a ceramic frit or other aeration device as known in the art.

The water exiting the zone 118 continues to flow downstream and passes through the reaction zone 63 and through walls of the reaction container 64 containing a dechlorination compound or other chemical or substance used to treat the fluid for discharging. The dechlorination agent compound is preferably sodium sulfite tablets. The sodium sulfite tablets (e.g. $NaSO_3$) are stacked in the chamber in the reaction container 64 which is then positioned in the column 50 and the pipe section 42 as shown. Other dechlorinating agents as known in the art can also be used. For example, alkali metal sulfites, alkali metal bisulfites, alkali metal sulfides, and various organic reducing agents can be used. Preferably, the dechlorination agent is a solid in tablet or granular form that can be placed in the reaction container.

The reaction container 64 is preferably cylindrical, approximately three inches in diameter, and fabricated from metal, PVC, or other material that will not interfere with the dechlorination. As shown in FIGS. 5 and 7, a bottom end of the container 64 is closed by a bottom wall 124 so that the sodium sulfite tablets do not fall through. The bottom wall 124 can be plastic in sheet form, film form or panel so as to retain the sodium sulfite tablets 120 in the reaction container 64. The bottom wall 124 is substantially non-reactive with the tablets 120 or water or other chemical process constituents. The bottom wall 124 can also be metal, or other material that is suited for the treatment process. The bottom wall 124 can be solid or can be provided with a plurality of apertures 125 as shown in FIG. 7.

The reaction container 64 is inserted into the main flow path of the chlorinated and aerated water passing through a pipe section 42. The column 51 of the section 42 is closed by the cap 54. The cap 54 covering the section 52 on the branch section 42 where the reaction container 64 is inserted can be threaded into the section 52. Alternatively, the cap 54 can be attached using other attachment mechanism whereby the cap 54 can be removably attached to the section 52, such as by clamping or force fitting via friction. The cap 54 keeps the tablets 120 dry while the reaction container 64 is in the pipe 22 and until the tablets are needed when the apparatus 20 is connected to a discharge water source, such as a spigot or fire hydrant. The cap 54 is also useful to prevent water from discharging from the section 52 when water flow through the apparatus 20 is excessively high in volume or pressure.

The sodium sulfite tablets 120 are stacked in a column and fed by gravity to the bottom of the reaction container 64. As tablets 120 at the bottom of the container disintegrate, more tablets drop downward to the bottom of the container 64. Alternatively, the container 64 can be provided with a spring-loaded mechanism such that spring tension applies a downward force to push the tablets 120 to the bottom of the container 64.

After the water passes through the container 64, it may be discharged into the environment. For a four-inch pipe 22, as shown in the illustrated embodiment, fluid flow rate is 60–80 gallons per minute. The fluid is dechlorinated to a non-detectable chlorine level as measured using a standard chlorine test kit.

Figure 3:
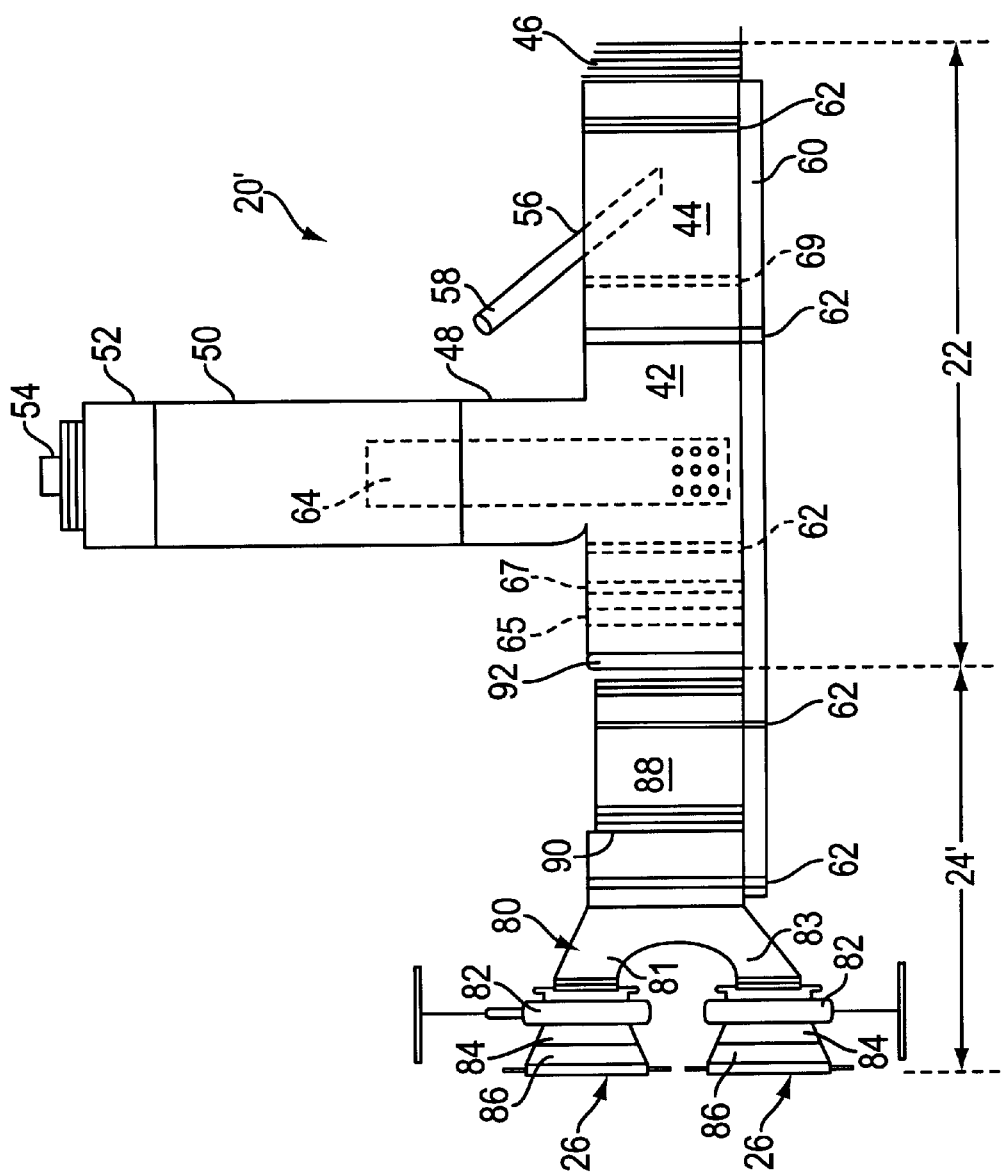
FIG. 3 is a side elevational view of a discharge fluid treatment apparatus along the longitudinal axis thereof and constructed in accordance with a further embodiment of the present invention.

With reference to FIGS. 1 and 3, a second screen 69 is placed in the discharge side of the pipe 22 to further aerate the dechlorinated water and form a second aeration zone down stream of the reaction zone. An air inlet pipe or tube 58 positioned on the discharge side of the second screen 69 allows air to be drawn into the now dechlorinated and aerated water. This results in an increase in oxygen content of the dechlorinated water, thereby discharging aerated and dechlorinated water into the environment having oxygen levels suitable for fish and wildlife. The air inlet tube 58 is at an offset angle from perpendicular with an outlet end facing downstream to increase the flow of air into the water. The angle of the air inlet tube can be variably adjustable with respect to the pipe 42 to selectively control the flow of air into the pipe 22.

With regard to the plate 65, smaller apertures in the center area of the plate reduce the force of the chlorinated water on the container 64, and therefore, on the sodium sulfite tablets. The number of apertures in the plate 65 depends on the size of the plate, taking into consideration the need to preserve the structural integrity of the plate. Some uniformity in aperture placement is desired to uniformly aerate the chlorinated water. The number of apertures is determined by numerous factors. Providing too many apertures in the plate may destroy the structural integrity of the plate, while providing too few apertures may create a backpressure to the apparatus 20. It is desirable not to have a pressurized system, but rather to minimize the pressure within the apparatus 20. Water flow pressure varies with the size of the pipes being used and the pressure. The nominal water flow pressure in typical city water supply lines is 100 psi.

Referring to FIG. 3, an alternative embodiment of the discharge fluid treatment apparatus 20' is depicted. Components of the apparatus 20' which are identical to components of the apparatus 20 in FIG. 1 have identical reference numerals. The coupling assembly 24' comprises a 4 inch-to-2.5 inch male Siamese connector 80 for connection to two outlet devices for water discharge. The two branches 81 and 83 of the Siamese connector 80 are each connected to a 2.5 inch female-to-2 inch male coupling 82, a two inch gate valve 84 and a 2 inch-to-2.5 inch female fire hose coupling 86, respectively.

With continued reference to FIG. 3, the coupling section 24' further comprises a four inch diameter and six inch long brass nipple 88 connected to the outlet 90 of the Siamese connector 80. The outlet of the brass nipple 88 is connected to a four inch diameter female thread PVC section 92 which is the inlet to the PVC branch section 42.

Figure 4:
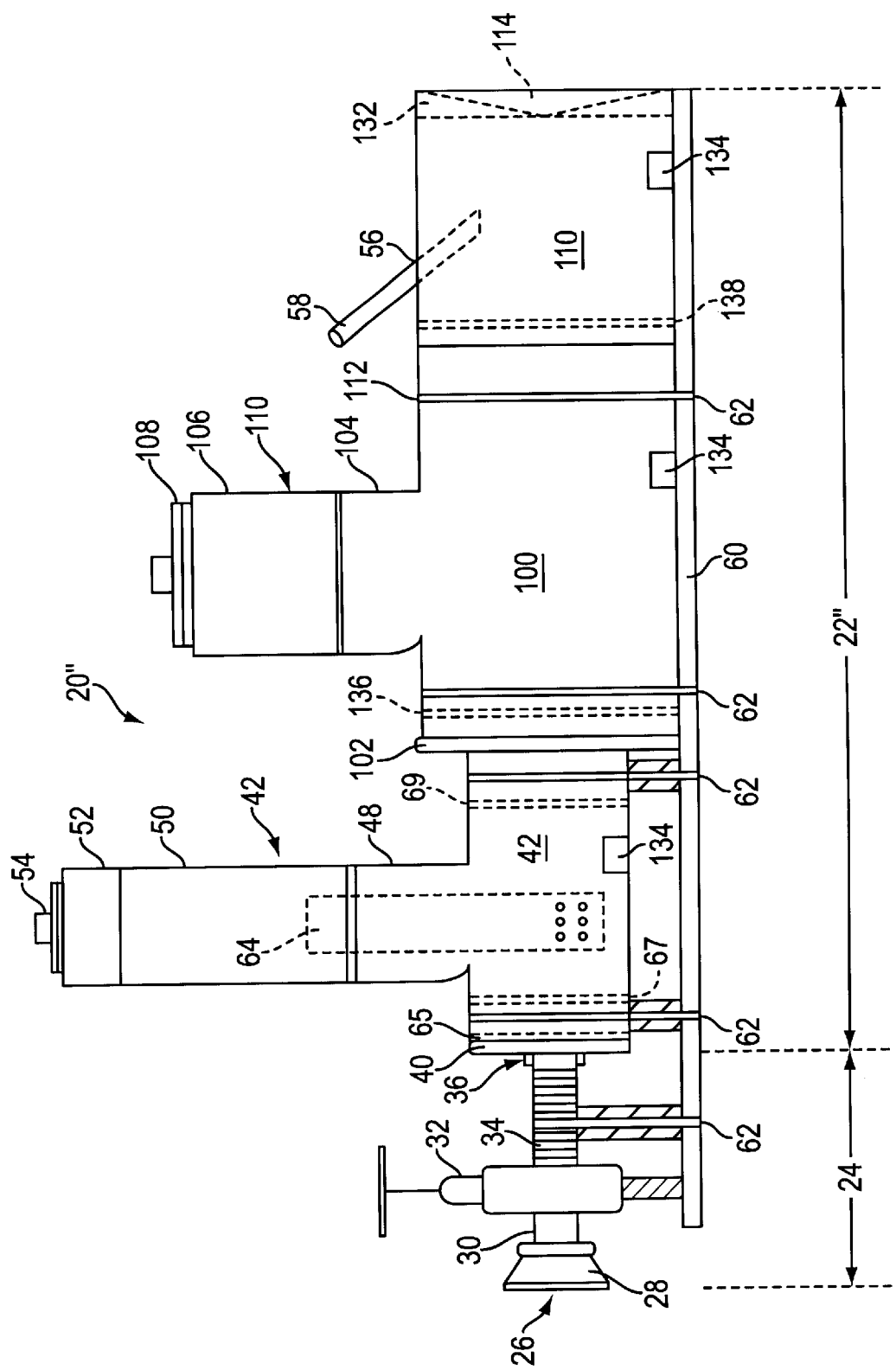
FIG. 4 is a side elevational view of a discharge fluid treatment apparatus along the longitudinal axis thereof and constructed in accordance with another embodiment of the present invention.

FIG. 4 depicts a discharge fluid treatment apparatus 20" constructed in accordance with another embodiment of the present invention. The coupling section 24 is substantially the same as in the embodiment of FIG. 1. The pipe assembly 22" has similar components to the pipe assembly 22 of the embodiment of FIG. 1, including the T-shaped branch section 42, the column section 50 and the coupling 52. The pipe assembly 22" is configured different from the pipe 22 of FIG. 1 in that a T-shaped pipe section 100 is substituted for the pipe section 44 of FIG. 1. The T-shaped pipe section 100 is connected to the T-shaped branch section 42 using a four inch-to-six inch PVC coupling 102. The section 100 is a T-branch section of PVC pipe that is preferably six inches in diameter, as well as six inches in diameter at the extension 104 thereof. A six-inch PVC column section 106 is connected to the extension 104 and preferably has a removable cover 108. A section of pipe 110 is connected to the branch section 100 via a coupling 112. The pipe 58 which is inserted in a hole 56 of the pipe section 44 as in FIG. 1 is provided in the pipe section 110 in the embodiment of FIG. 4. The pipe 58 operates as an air inlet, as will be described in further detail below. The pipe section 110 has an outlet 114 through which fluid introduced into the apparatus 20" at inlet 26 is discharged.

With reference to FIG. 4, a second branched T-shaped section 110 is connected to the pipe 22" downstream from the dechlorination section (i.e., the container 64 and branch section 42) for dispensing a pH adjusting agent into the dechlorinated water. In this second downstream branch section 110, a source of carbon dioxide, such as dry ice, can be placed directly into column 106 to contact the downstream flow of the dechlorinated water to adjust the pH of the water to be discharged to comply with environmental regulations. In further embodiments, a reaction container containing a pH adjusting agent can be positioned in the column 106. The container has a structure substantially the same as the reaction container 64. Suitable pH adjusting agents, as known in the art, can be used to raise or lower the pH as necessary to achieve a target value. Wire mesh screens 136 and 138 are also provided downstream of the dechlorination section (i.e., the chamber 64 and the branch section 42) to further aerate the water and increase the oxygen content thereof.

At the inlet of the pipe 22, inlet flow regulation can be performed utilizing a valve. In another embodiment, a check valve 132 can be provided at the downstream outlet side of the pipe 22 or 22" (e.g., at outlet 46 or 114) to prevent back cycling. Back cycling can result when a discharge hose is detached and previously discharged water can be back cycled into the pipe 22 or 22".

For illustrative purposes, sensors 134 are provided in the pipe 22" in FIG. 4. Sensors 134 can be placed at various locations in and on the apparatus 20. For example, sensors 134 can be placed to monitor water quality and therefore operation of the apparatus 20. Water flow rate of the water as it enters and discharges from the apparatus 20 can be sensed and telemetered to monitoring stations remote from the actual site of the water discharge. Sensors can be placed both at the inlet 26 and the outlet 46 or 114 to measure chlorine content of the water, or oxygen content of the water. The sensors can be standard chlorine and oxygen sensors as known in the art. A sensor 134 can also be provided to measure various contaminants that may be present in the water. Temperature can also be measured. A flow meter can also be provided. All the information taken from various sensors 134 can be stored and/or transmitted to a remote monitoring site.

The apparatus of the present invention can be self-contained in a box (not shown) having inlet and outlet port connectors and one or more openings to insert the tablets 120 and, optionally, dry ice. An opening can also be provided to supply air via the air inlet tube 58. This box can be lockable and hinged to prevent unauthorized access, such as by children playing in the area in which apparatus 20 is used. In this manner, sodium sulfite or other compounds can be placed in the reaction chamber 64 and secured to prevent children, animals, or other wildlife from disturbing the apparatus 20.

The components described above with reference to the apparatus 20 operate in a similar manner to components having identical numbers in the apparatus 20' (FIG. 3) and the apparatus 20" (FIG. 4). The optimum temperature range for using this device is ambient, preferably above freezing. The pipe comprising sections 24 or 24' and 22 or 22" can be constructed as a unitary piece and can be formed from plastic, metal or other material for fluid retention and flowthrough.

In another embodiment of the present invention, the apparatus 20 is used to rechlorinate water, for example, for the introduction of water into a swimming pool. Other uses for the apparatus 20 of the present invention are, for example, dechlorinating water prior to use in a snowmaking machine or to dechlorinate water being removed from a swimming pool. Additionally, sewage treatment facilities that chlorinate water prior to discharge into rivers, lakes, streams, or the ocean, are often required to perform dechlorination prior to final discharge.

Homeowners may find uses for the apparatus 20, particularly if environmental laws become more restrictive on the discharge of chlorinated water into the environment when irrigating lawns, gardens, and performing general landscaping. Many localities require construction vehicles to be cleansed of debris such as mud prior to their re-entrance onto public roadways. The apparatus 20 of the present invention can be used to dechlorinate water coming from a hose or fire hydrant or other water source prior to being used to wash the vehicles and then being discharged into the environment. Additionally, street washing machines use chlorinated water taken from local fire hydrants or other chlorinated water sources. The apparatus 20 or the present invention can be used either for hooking up to the water source prior to filing the street washing vehicle, or placed at the outlet port of the water holding tank of the street washing vehicle. Other uses of the present invention include home use to dechlorinate potable water prior to placing into a fish tank or fishpond. Boat owners and ship owners often wash their decks and boats with water coming from a hose at dockside. If this water is chlorinated potable water, the apparatus of the present invention can be used to dechlorinate the water prior to washing down the boat and therefor prior to the wastewater being discharged into the river, bay, or harbor.

The above examples are just a few of the possible uses of the apparatus of the present invention for dechlorination of potable chlorinated water. However, the present invention is not limited to dechlorination, and can be used for other chemical treatment, wherein reaction agents are placed in the chamber 64 for either removal of compounds or elements from a fluid or for the addition of chemicals or agents into a fluid, for example, desalination, chlorination, demineralization, deionization, and the like. Additionally, the apparatus 20 is not limited to the input and discharge of water, and can be used with any fluid to be treated by passing through the chamber 64 containing either a reactive compound or catalyst or simply passing through the aeration zone 118.

Although the present invention has been described with reference to a number of preferred embodiments thereof, it will be understood that the invention is not limited to the details thereof. Various modifications and substitutions have been suggested in the foregoing description, and others will occur to those of ordinary skill in the art. All such substitutions are intended to be embraced within the scope of the invention.

What is claimed is:

1. An apparatus for treating water comprising:
   a conduit having a longitudinal axis with an upstream end defining a water inlet and downstream end defining a water outlet, said conduit defining a substantially linear flow path extending substantially coaxially to said longitudinal axis;
   a supply inlet extending into said conduit and substantially perpendicular to said conduit; and
   a reaction container positioned in said supply inlet and said conduit, said reaction container being dimensioned for containing a water treating agent and having a side wall with a plurality of apertures therein for allowing water passing through said conduit to pass through said reaction container, said reaction container having a side wall, a bottom wall, and an internal wall extending transversely with respect to said side wall and spaced from said bottom wall, said internal wall having a plurality of apertures therein and positioned to support said water treating agent.

2. The apparatus of claim 1, wherein said conduit includes a side wall and said supply inlet extends substantially transversely through said side wall.

3. The apparatus of claim 2, further comprising a supply pipe coupled to said conduit and defining said supply inlet for receiving said reaction container, said pipe having a first open end and a second end coupled to said conduit.

4. The apparatus of claim 3, wherein said reaction container is positioned in said supply pipe.

5. The apparatus of claim 3, further comprising a removable closure coupled to said open end of said supply pipe.

6. The apparatus of claim 3, wherein said conduit is oriented substantially horizontally and said supply pipe is oriented substantially vertically.

7. The apparatus of claim 1, wherein said reaction container has a closed bottom wall positioned in said conduit.

8. The apparatus of claim 1, wherein said reaction container has a bottom wall with a plurality of apertures therein.

9. The apparatus of claim 1, further comprising an aerator positioned in said conduit positioned immediately upstream of said reaction container.

10. The apparatus of claim 9, wherein said aerator comprises a planar member having plurality of apertures therein.

11. The apparatus of claim 1, further comprising an aerator positioned in said conduit downstream of said reaction container.

12. The apparatus of claim 1, further comprising a plate member mounted in said conduit and extending transversely with respect to a side wall of said conduit, said plate member having a plurality of first apertures positioned in a central area of said plate member and a plurality of second apertures positioned in a peripheral area of said plate member, said first apertures having a dimension less than a dimension of said second apertures to restrict the flow of water through said central area of said plate and to restrict the flow of water through a central area of said conduit.

13. An apparatus for treating water, comprising
   a water conduit having a side wall, a water inlet at an upstream end of said conduit, and a water outlet at a downstream end of said conduit, said side wall defining an axial passage extending from said inlet to said outlet;
   a supply conduit coupled to said side wall and defining an opening through said side wall into said water conduit; and
   a reaction container for containing a water treating agent and positioned in said supply conduit and in said axial passage of said water conduit, said reaction container having a side wall with a plurality of apertures for allowing water in said axial passage to flow through said reaction container, said reaction container being dimensioned to receive a water treating agent in an amount to effectively treat water passing through said water conduit, said reaction container having a side wall, a bottom wall, and an internal wall extending transversely with respect to said side wall and spaced from said bottom wall, said internal wall having a plurality of apertures therein and positioned to support said water treating agent.

14. The apparatus of claim 13, wherein said supply conduit extends substantially perpendicular to said side wall.

15. The apparatus of claim 13, further comprising a removable closure coupled to a top open end of said supply conduit.

16. The apparatus of claim 13, wherein said reaction container has a closed bottom wall positioned in said conduit.

17. The apparatus of claim 13, wherein said reaction container has a bottom wall with a plurality of apertures therein.

18. The apparatus of claim 13, further comprising an aerator positioned in said conduit positioned upstream of said reaction container.

19. The apparatus of claim 18, further comprising a plate member mounted in said conduit and extending transversely with respect to a side wall of said conduit, said plate member having a plurality of first apertures positioned in a central area of said plate member and a plurality of second apertures positioned in a peripheral area of said plate member, said first apertures having an area less than an area of said second apertures to restrict the flow of water through said central area of said plate member and to restrict the flow of water through a central area of said conduit.

20. The apparatus of claim 13, further comprising an aerator positioned in said conduit downstream of said reaction container.

21. The apparatus of claim 20, said aerator comprising a planar member having plurality of apertures therein.

22. A method of dechlorinating water comprising the steps of
   feeding water through a treating apparatus, said apparatus having a conduit with an inlet for receiving untreated water and an outlet for discharging treated water, an inlet pipe coupled to said conduit and defining a transverse inlet into said conduit, said conduit defining a substantially axial flow path through said apparatus;
   supplying a water dechlorinating agent into a reaction container and positioning said reaction container in said conduit through said transverse inlet, said reaction container having a side wall with a plurality apertures therein; and
   feeding said water through said conduit to pass through said reaction container to contact said water dechlorinating agent and to dechlorinate said water and discharging treated water through said outlet.

23. The method of claim 22, wherein said dechlorinating agent is sodium sulfite.

24. The method of claim 22, further comprising the step of providing a source of carbon dioxide in said conduit for introducing carbon dioxide into said water.

25. The method of claim 24, wherein said source of carbon dioxide is solid carbon dioxide.

26. The method of claim 22, wherein said conduit comprises a gas supply pipe extending through a side wall of said conduit and having an outlet end positioned in a flow path of said conduit and said method comprising passing a treating gas through said gas supply pipe and injecting said treating gas into said water.

27. The method of claim 26, wherein said gas is air.

28. The method of claim 22, wherein said apparatus includes an aerator positioned in said conduit upstream of said reaction container and said method comprises aerating said water.

29. The method of claim 28, further comprising a planar member extending substantially perpendicular to said flow path, said plate member having a plurality of first apertures in a central area of said plate member and a plurality of second apertures in a peripheral area of said plate member, said first apertures having an area less than said second apertures, said method comprising positioning said plate member in said path to restrict water through said reaction container.

30. The method of claim 22, wherein said apparatus includes an aerator downstream of said reaction container, and said method comprises aerating said water.

31. An apparatus for treating water, comprising
a water conduit having a side wall, a water inlet at an upstream end of said conduit, and a water outlet at a downstream end of said conduit, said side wall defining an axial passage extending from said inlet to said outlet;
a supply conduit coupled to said side wall and defining an opening through said side wall into said water conduit; and
a reaction container for containing a water treating agent and positioned in said supply conduit and in said axial passage of said water conduit, said reaction container having a side wall with a plurality of apertures for allowing water in said axial passage to flow through said reaction container, said reaction container being dimensioned to receive a water treating agent in an amount to effectively treat water passing through said water conduit and said reaction container is free floating in said supply conduit.

32. An apparatus for treating water, comprising
a water conduit having a side wall, a water inlet at an upstream end of said conduit, and a water outlet at a downstream end of said conduit, said side wall defining an axial passage extending from said inlet to said outlet;
a supply conduit coupled to said side wall and defining an opening through said side wall into said water conduit;
a reaction container for containing a water treating agent and positioned in said supply conduit and in said axial passage of said water conduit, said reaction container having a side wall with a plurality of apertures for allowing water in said axial passage to flow through said reaction container, said reaction container being dimensioned to receive a water treating agent in an amount to effectively treat water passing through said water conduit; and
a plate member mounted in said conduit and extending transversely with respect to said side wall of said conduit, said plate member having a plurality of first apertures positioned in a central area of said plate member and a plurality of second apertures positioned in a peripheral area of said plate member, said first apertures having an open area less than an open area of said second apertures to restrict the flow of water through said central area of said plate member and to restrict the flow of water through a central area of said conduit.

33. An apparatus for treating water, comprising
a water conduit having a side wall, a water inlet at an upstream end of said conduit, and a water outlet at a downstream end of said conduit, said side wall defining an axial passage extending from said inlet to said outlet;
a supply conduit coupled to said side wall and defining an opening through said side wall into said water conduit;
a reaction container for containing a water treating agent and positioned in said supply conduit and in said axial passage of said water conduit, said reaction container having a side wall with a plurality of apertures for allowing water in said axial passage to flow through said reaction container, said reaction container being dimensioned to receive a water treating agent in an amount to effectively treat water passing through said water conduit; and
a gas supply pipe extending through a side wall of said conduit and having an outlet end positioned in a flow path of said conduit for introducing a treating gas into said flow path.

* * * * *